(12) United States Patent
Yoshioka et al.

(10) Patent No.: US 12,304,867 B2
(45) Date of Patent: May 20, 2025

(54) COMPOSITE MEMBER

(71) Applicant: Panasonic Intellectual Property Management Co., Ltd., Osaka (JP)

(72) Inventors: Tatsuro Yoshioka, Osaka (JP); Ryosuke Sawa, Osaka (JP); Naoki Kurizoe, Osaka (JP); Natsuki Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/275,309

(22) PCT Filed: Feb. 5, 2021

(86) PCT No.: PCT/JP2021/004405
§ 371 (c)(1),
(2) Date: Aug. 1, 2023

(87) PCT Pub. No.: WO2022/168281
PCT Pub. Date: Aug. 11, 2022

(65) Prior Publication Data
US 2024/0124360 A1    Apr. 18, 2024

(51) Int. Cl.
*H01B 1/14* (2006.01)
*C04B 35/117* (2006.01)
(Continued)

(52) U.S. Cl.
CPC .............. *C04B 35/117* (2013.01); *H01B 1/14* (2013.01); *H01B 1/16* (2013.01); *H01B 1/18* (2013.01); *C04B 2235/3218* (2013.01); *C04B 2235/402* (2013.01); *C04B 2235/407* (2013.01); *C04B 2235/422* (2013.01)

(58) Field of Classification Search
CPC ........... C04B 35/117; C04B 2235/3218; C04B 38/0074
See application file for complete search history.

(56) References Cited

U.S. PATENT DOCUMENTS

2011/0198218 A1    8/2011  Fuji et al.
2013/0329272 A1   12/2013  Matsumura et al.
(Continued)

FOREIGN PATENT DOCUMENTS

JP    5-114404 A    5/1993
JP    2008-87988 A    4/2008
(Continued)

OTHER PUBLICATIONS

Ghobadi et al.; "Micorowave-assisted sintering od Al2O3-MWCNT nanocomposites"; Ceramics International; vol. 43, No. 8; Feb. 2, 2017 (Feb. 2, 2017), pp. 6105-6109; xp093132461, NL ISSN:0272-8842,DOI:10.1016/j.ceramint.2017.02.003.
(Continued)

*Primary Examiner* — Khanh T Nguyen
(74) *Attorney, Agent, or Firm* — Renner, Otto, Boisselle & Sklar, LLP

(57) ABSTRACT

Provided is a composite member including an inorganic matrix part that is made from an inorganic substance including a metal oxide hydroxide; and an electrically conductive material part that is present in a dispersed state inside the inorganic matrix part and has electric conductivity. In the composite member, a porosity in a cross section of the inorganic matrix part is 20% or less.

17 Claims, 9 Drawing Sheets

(51) Int. Cl.
*H01B 1/16* (2006.01)
*H01B 1/18* (2006.01)

(56) References Cited

U.S. PATENT DOCUMENTS

| | | |
|---|---|---|
| 2015/0340121 A1 | 11/2015 | Ootomo et al. |
| 2022/0162850 A1 | 5/2022 | Kurizoe et al. |
| 2022/0185737 A1 | 6/2022 | Sato et al. |
| 2022/0186038 A1 | 6/2022 | Kurizoe et al. |

FOREIGN PATENT DOCUMENTS

| | | |
|---|---|---|
| JP | 2009-123691 A | 6/2009 |
| JP | 5096720 B | 12/2012 |
| JP | 2014-138061 A | 7/2014 |
| WO | 2012108322 A1 | 8/2012 |
| WO | 2020/195182 A1 | 10/2020 |
| WO | 2020/195183 A1 | 10/2020 |
| WO | 2020/195184 A1 | 10/2020 |
| WO | 2020/195185 A1 | 10/2020 |

OTHER PUBLICATIONS

Extended European Search Report for corresponding EP Application No. 21924675.8 dated Mar. 5, 2024.
Search Report for corresponding Chinese Patent Application No. 202180092853.0 issued May 16, 2024, with English machine translation.
International Search Report for corresponding Application No. PCT/JP2021/004405, mailed Apr. 13, 2021.
Written Opinion for corresponding Application No. PCT/JP2021/004405, mailed Apr. 13, 2021.

FIG. 5
(a)
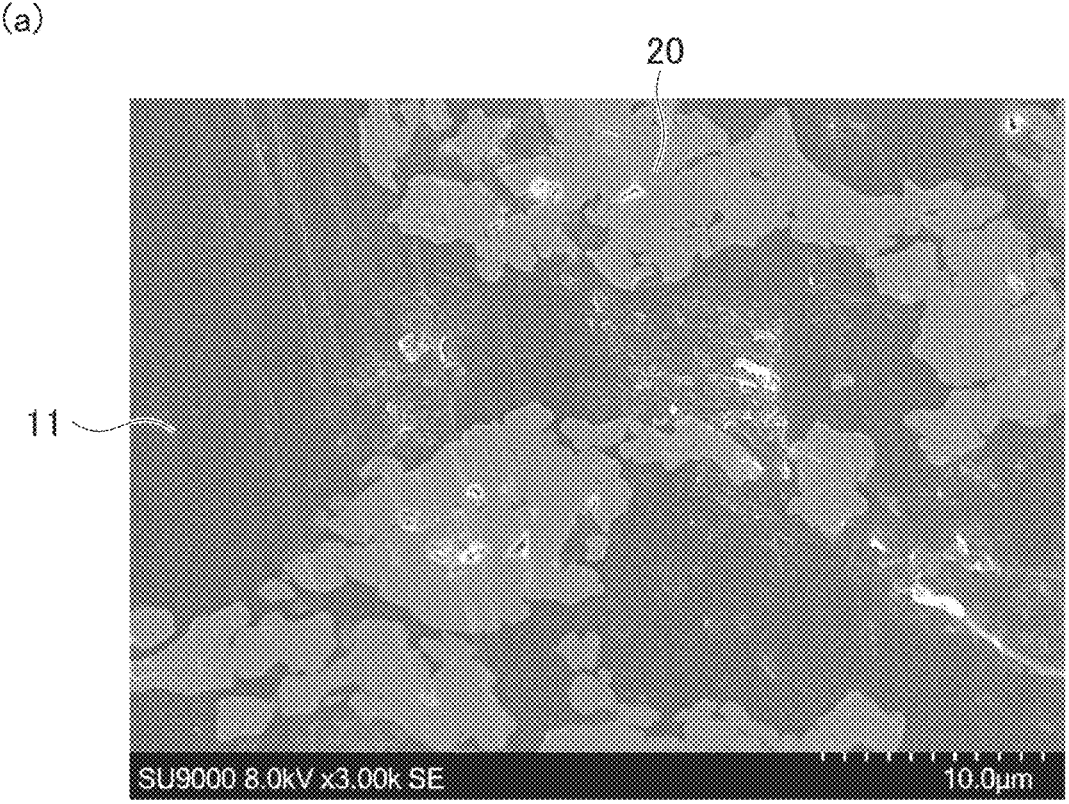
(b)
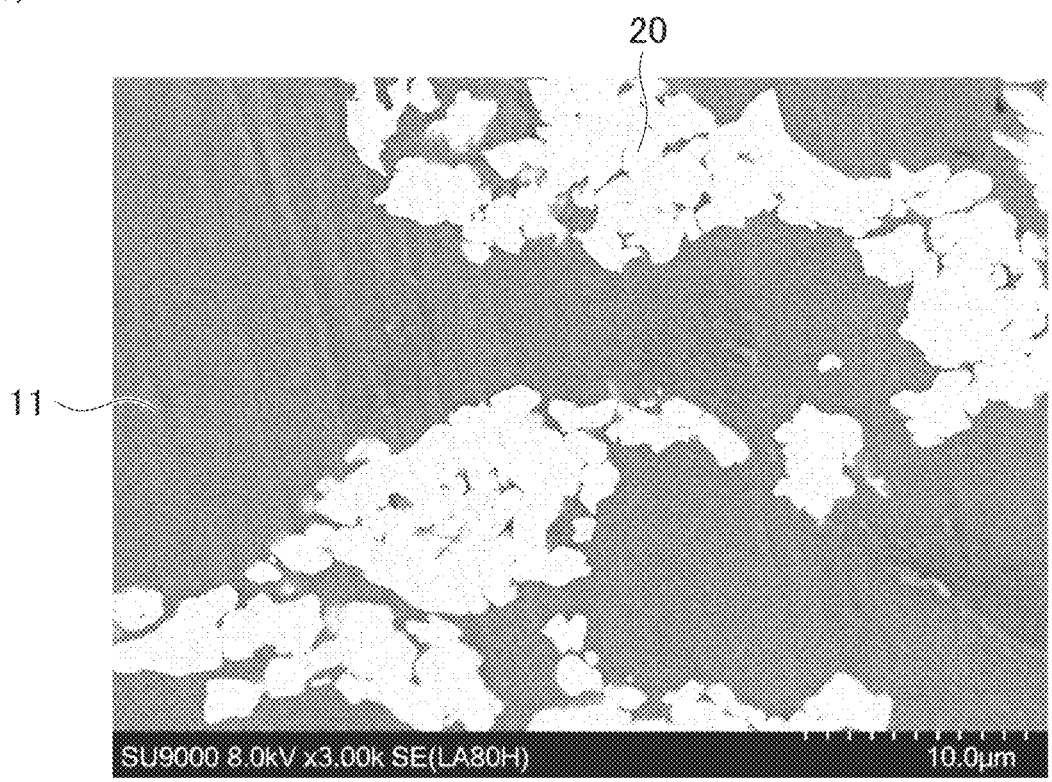

FIG. 6
(a)
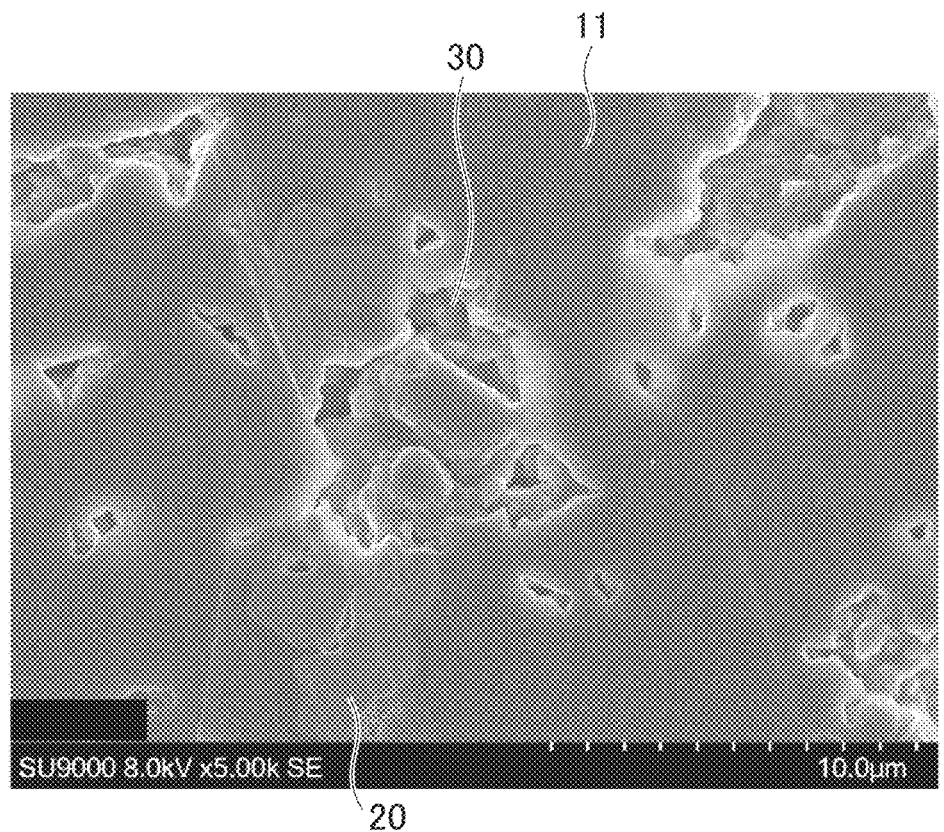
(b)
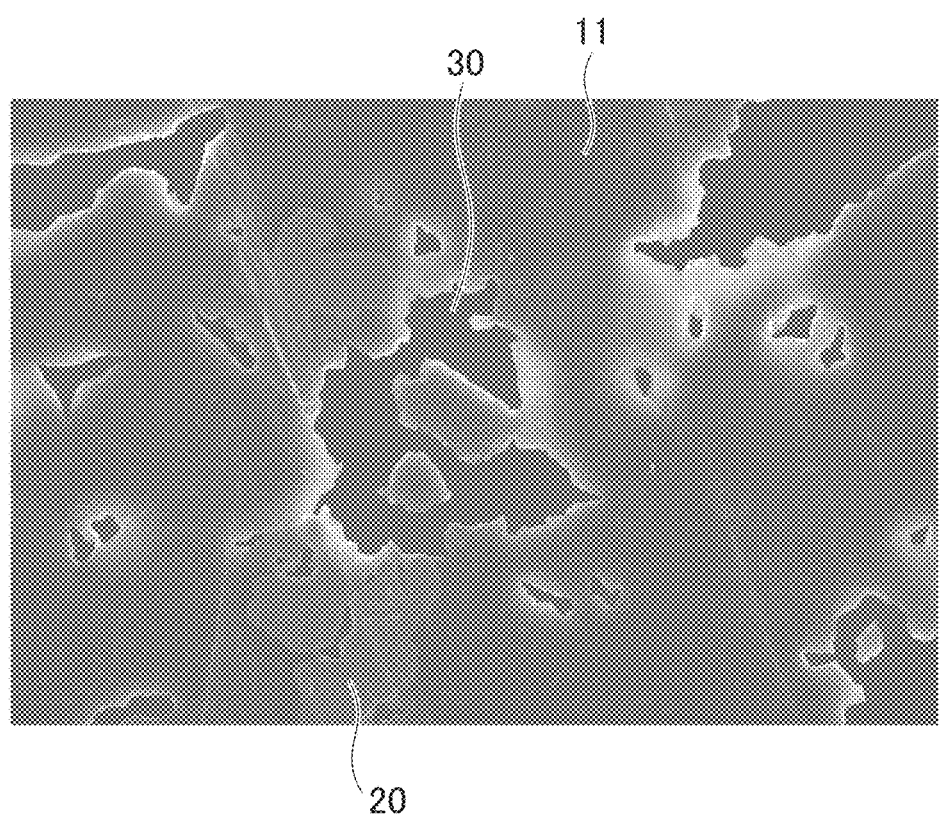

FIG. 7
(a)
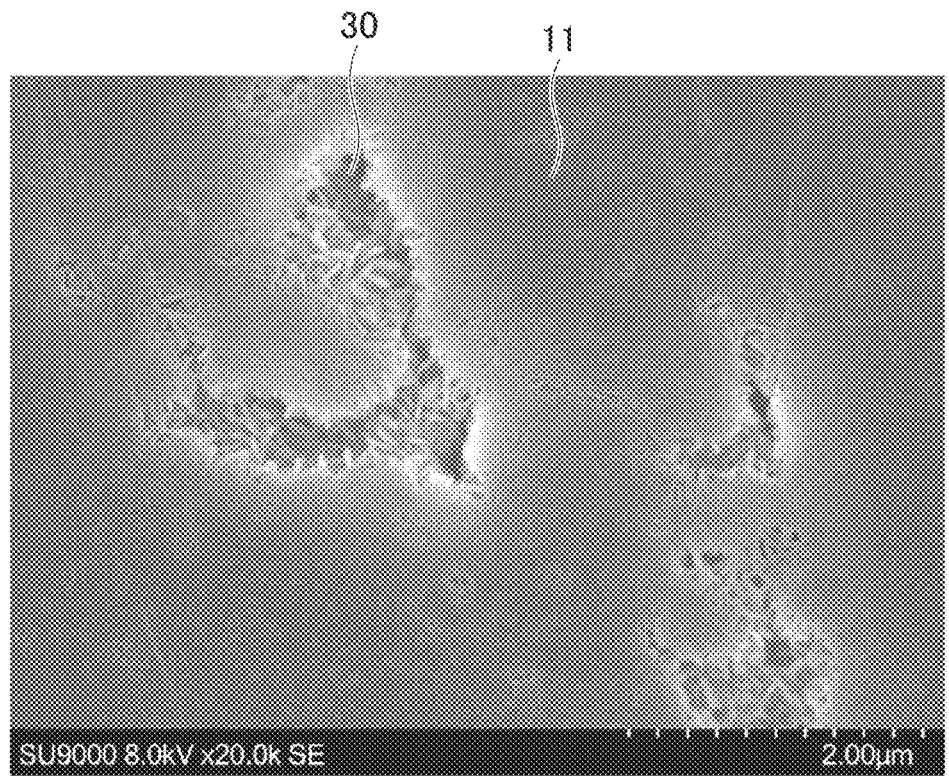
(b)
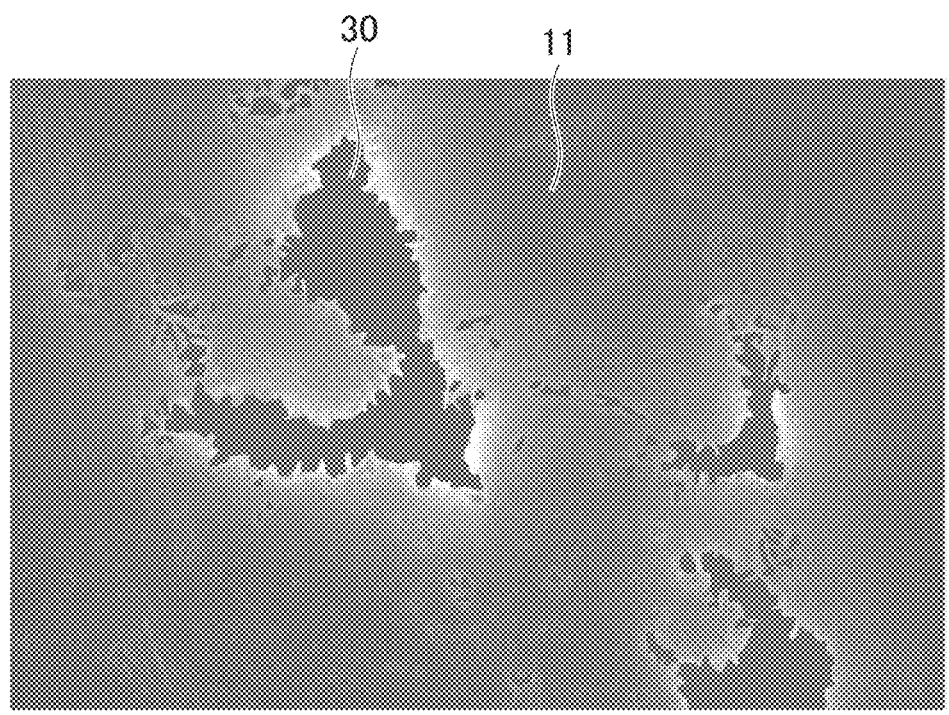

FIG. 8
(a)
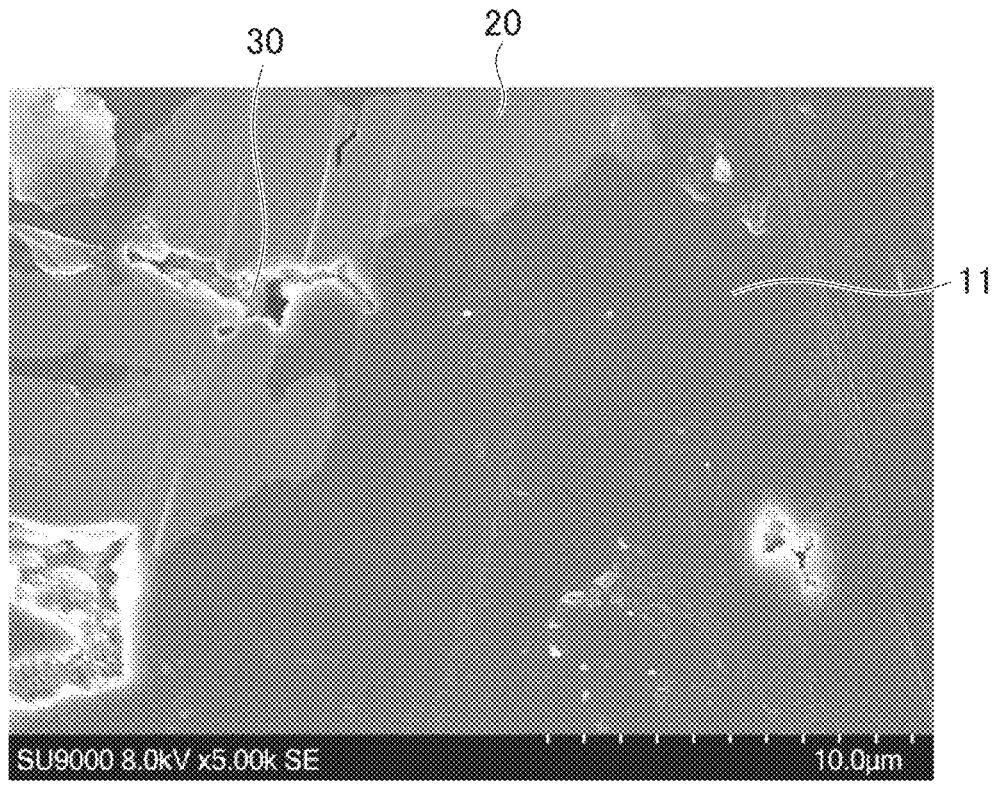
(b)
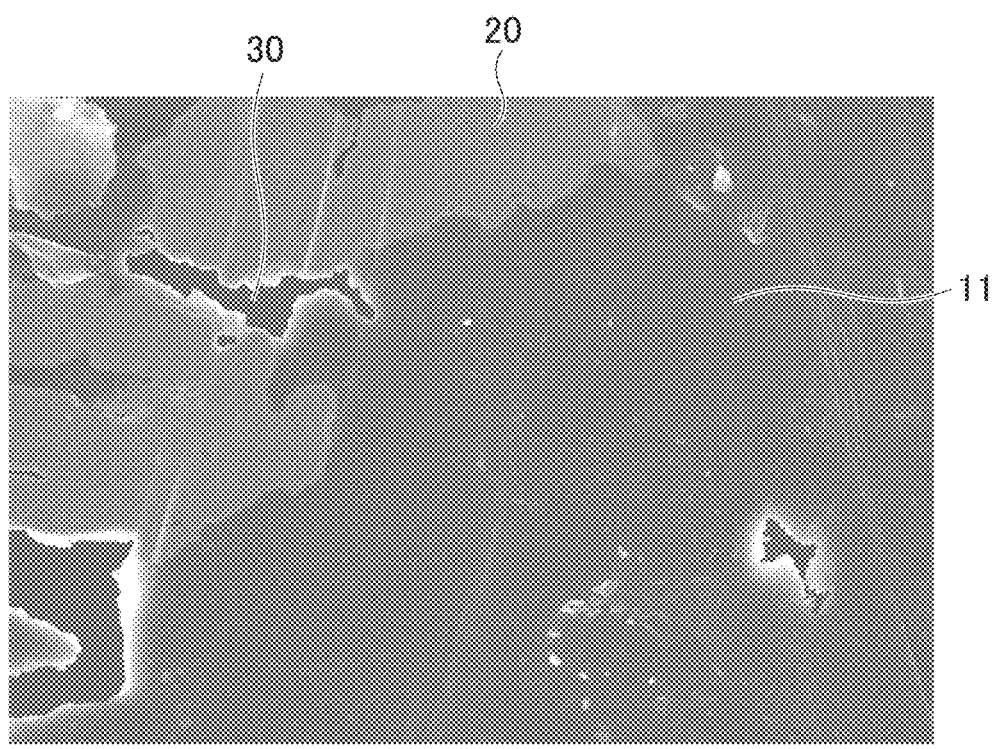

FIG. 9
(a)
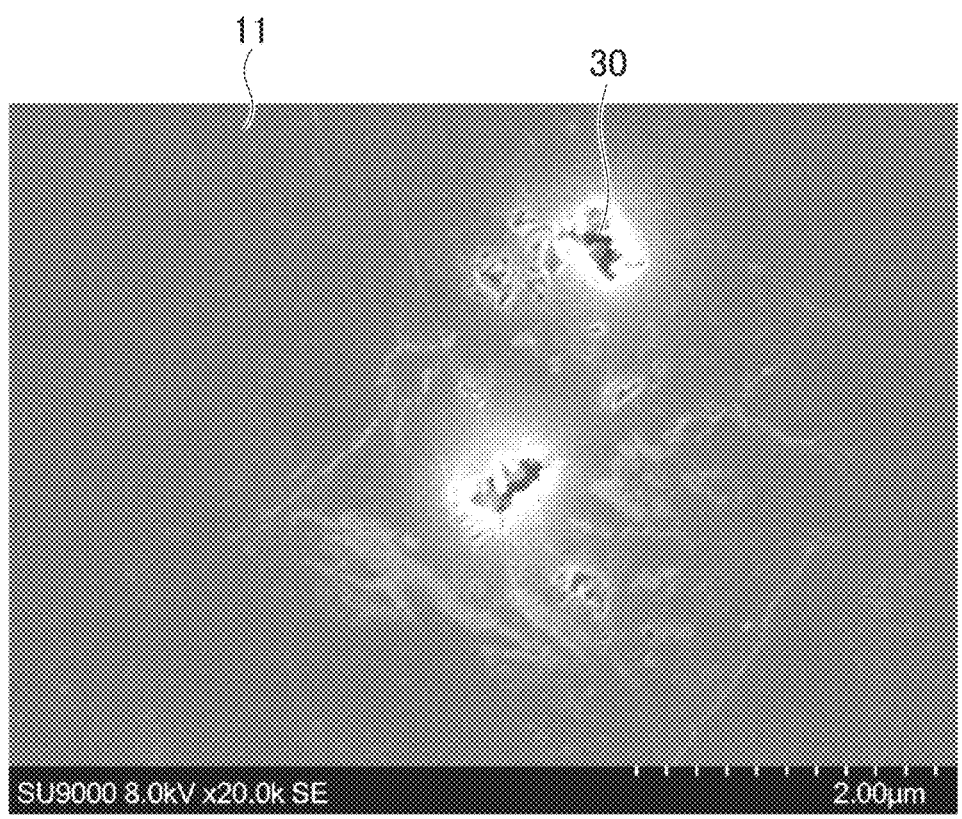
(b)
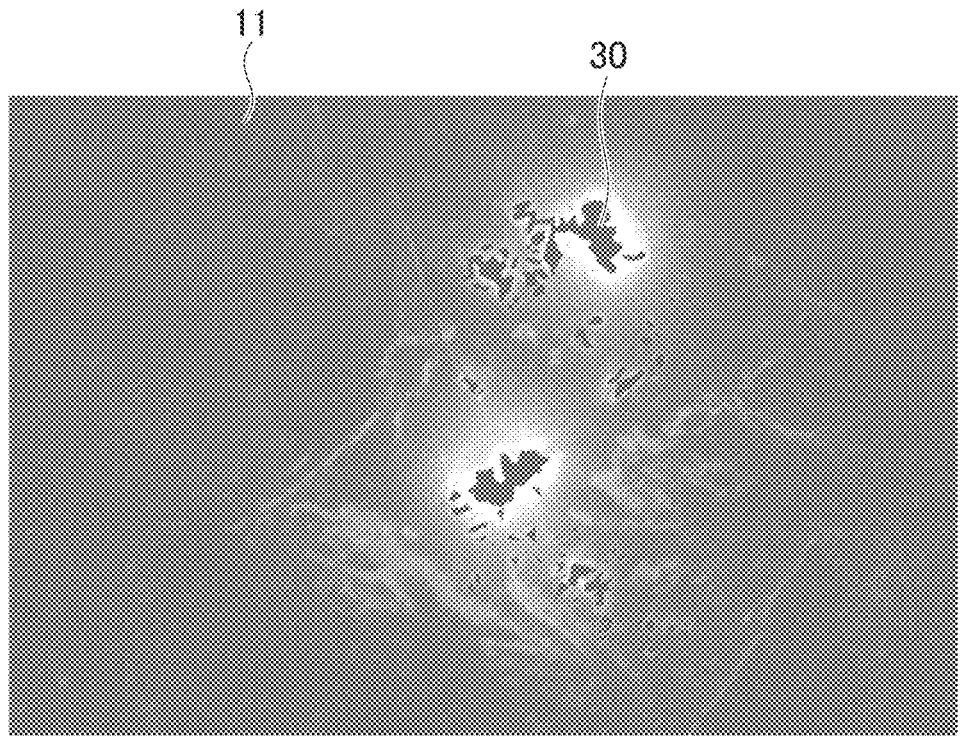

COMPOSITE MEMBER

TECHNICAL FIELD

The present invention relates to a composite member.

BACKGROUND ART

The demand for ceramic having relatively high electric conductivity has recently increased in the electrical and electronic fields. Thus, research on imparting electric conductivity to ceramic is being actively conducted.

Patent Literature 1 discloses an alumina sintered body, a silicon nitride sintered body, and an aluminum nitride sintered body imparted with electric conductivity. Specifically, Patent Literature 1 discloses electrically conductive composite ceramic having a structure in which electrically conductive ceramic particles made from one or more of TiC, TiN, WC, TaC, MoC, NbC, and VC are finely dispersed in non-electrically conductive ceramic made from one or more of $Al_2O_3$, $Si_3N_4$, and AlN.

CITATION LIST

Patent Literature

Patent Literature 1: Japanese Patent No. 5096720

SUMMARY OF INVENTION

Here, in the sintering process of Patent Literature 1, a compact is heated at 1300 to 2000° C. under an inert gas atmosphere to prevent oxidative decomposition of electrically conductive ceramic particles. That is, a method for manufacturing electrically conductive ceramic using the conventional sintering method requires calcination under an inert atmosphere to prevent oxidative decomposition of an electrically conductive material. Since the conventional sintering method requires a compact to be heated to, for example, 1000° C. or higher, only an electrically conductive material having high heat resistance may be used.

The present invention has been made in consideration of the above issues, which are inherent in the related art. An object of the present invention is to provide a composite member that does not require calcination under a high temperature and an inert atmosphere during manufacturing and is capable of imparting electric conductivity even when an electrically conductive material having low heat resistance is used.

In response to the above issue, a composite member according to an aspect of the present invention includes an inorganic matrix part that is made from an inorganic substance including a metal oxide hydroxide, and an electrically conductive material part that is present in a dispersed state inside the inorganic matrix part and has electric conductivity. In the composite member, a porosity in a cross section of the inorganic matrix part is 20% or less.

BRIEF DESCRIPTION OF DRAWINGS

FIG. 5 includes scanning electron micrographs illustrating a result of observing a cross section of a test sample of example 2 at a magnification of 3,000 times, in which (a) illustrates a secondary electron image of the cross section of the test sample, and (b) illustrates a reflected electron image of the cross section of the test sample.

FIG. 6 includes scanning electron micrographs illustrating a result of observing a cross section of a test sample of example 1 at a magnification of 5,000 times, in which (a) illustrates a secondary electron image of the cross section of the test sample, and (b) illustrates binarized data of the secondary electron image.

FIG. 7 includes scanning electron micrographs illustrating a result of observing the cross section of the test sample of example 1 at a magnification of 20,000 times, in which (a) illustrates a secondary electron image of the cross section of the test sample, and (b) illustrates binarized data of the secondary electron image.

FIG. 8 includes scanning electron micrographs illustrating a result of observing the cross section of the test sample of example 2 at a magnification of 5,000 times, in which (a) illustrates a secondary electron image of the cross section of the test sample, and (b) illustrates binarized data of the secondary electron image.

FIG. 9 includes scanning electron micrographs illustrating a result of observing the cross section of the test sample of example 2 at a magnification of 20,000 times, in which (a) illustrates a secondary electron image of the cross section of the test sample, and (b) illustrates binarized data of the secondary electron image.

DESCRIPTION OF EMBODIMENTS

Figure 1:
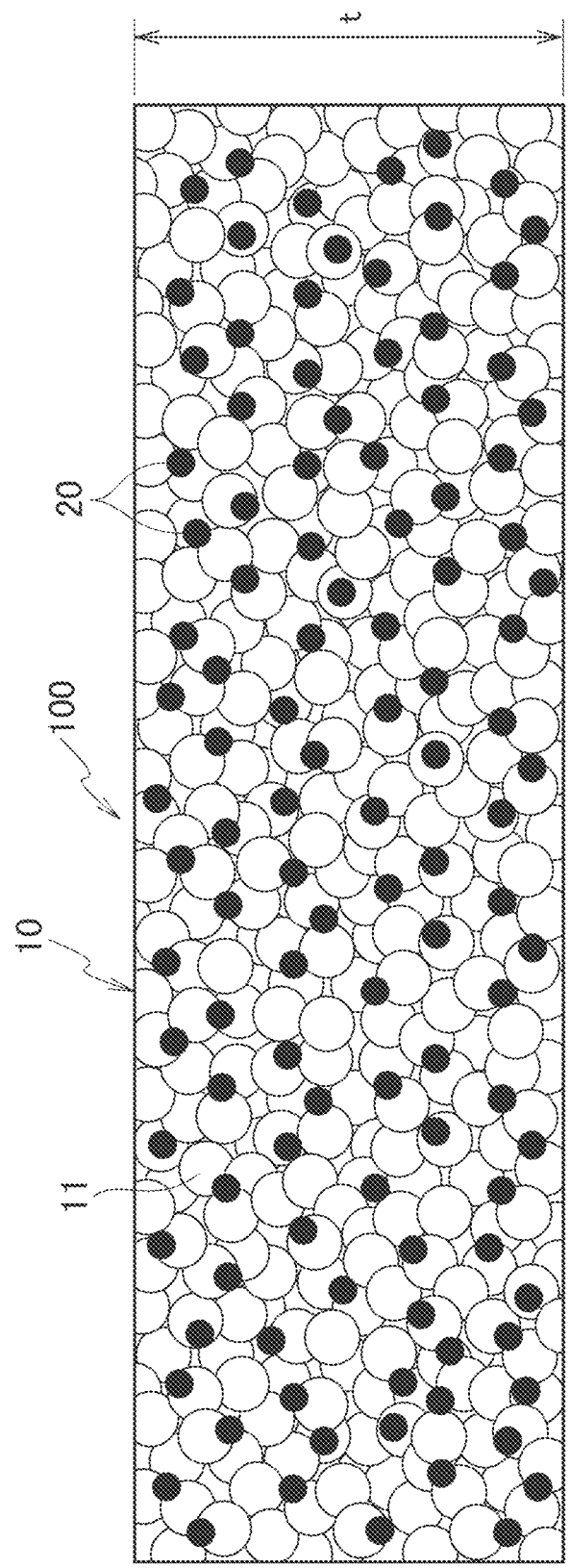
FIG. 1 is a cross-sectional view schematically illustrating an example of a composite member according to a present embodiment.

Referring to the drawings, a description is given below of a composite member and a method for manufacturing the composite member according to the present embodiment. Note that dimensional ratios in the drawings are exaggerated for convenience of the description and are sometimes different from actual ratios.

[Composite Member]

A composite member 100 according to the present embodiment includes an inorganic matrix part 10 and an electrically conductive material part 20 that directly bonds with the inorganic matrix part 10 with no adhesive material which is different from an inorganic substance making up the inorganic matrix part 10 provided therebetween. Specifically, as described in FIG. 1, the composite member 100 includes the inorganic matrix part 10 made from the inorganic substance, and the electrically conductive material part 20, which is present in a dispersed state within the inorganic matrix part 10.

As illustrated in FIG. 1, the inorganic matrix part 10 includes multiple particles 11 made from an inorganic substance, and the particles 11 made from the inorganic substance bond with each other to form the inorganic matrix part 10.

The inorganic substance making up the inorganic matrix part 10 preferably contains at least one metallic element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, the inorganic substance preferably contains at least one metallic element selected from the group consisting of aluminum, iron, nickel, gallium, and yttrium.

The inorganic substance making up the inorganic matrix part 10 contains an oxide hydroxide of a metallic element mentioned above. The inorganic substance preferably contains an oxide hydroxide of a metallic element mentioned above as a main component. That is, the inorganic substance preferably contains an oxide hydroxide of a metallic element mentioned above in an amount of 50 mol % or more, more preferably in an amount of 80 mol % or more. Such an inorganic substance has high stability against oxygen and water vapor in the atmosphere. Accordingly, arranging the electrically conductive material part 20 inside the inorganic matrix part 10 reduces contact of the electrically conductive material part 20 with oxygen and water vapor and thus can suppress deterioration of the electrically conductive material part 20. Note that when the inorganic substance contains an oxide hydroxide of a metallic element mentioned above as a main component, the inorganic substance may contain a hydroxide of a metallic element mentioned above.

The inorganic matrix part 10 is preferably a polycrystalline substance. That is, it is preferable that the particles 11 of the inorganic substance be crystalline particles and that the inorganic matrix part 10 be made from an aggregation of many particles 11. When the inorganic matrix part 10 is a polycrystalline substance, the composite member 100 can be obtained having high durability compared to the case where the inorganic matrix part 10 is made from an amorphous substance. Note that the particles 11 of the inorganic substance are more preferably crystalline particles containing at least one metallic element selected from the group consisting of an alkali metal, an alkaline earth metal, a transition metal, a base metal, and a semimetal. The particles 11 of the inorganic substance are preferably crystalline particles containing an oxide hydroxide of a metallic element mentioned above. The particles 11 of the inorganic substance are more preferably crystalline particles containing an oxide hydroxide of a metallic element mentioned above as a main component.

It is preferable that the metal oxide hydroxide contained in the inorganic substance of the inorganic matrix part 10 be boehmite. Boehmite is aluminum oxide hydroxide represented by a composition formula of AlOOH. Boehmite has a property of high chemical stability since it is insoluble in water and hardly reacts with acids and alkalis at room temperature, and also has a property of excellent heat resistance due to high dehydration temperature of around 500° C. Since boehmite has a relative density of about 3.07, when the inorganic matrix part 10 is made from boehmite, the composite member 100 can be obtained being lightweight and having excellent chemical stability.

When the inorganic substance making up the inorganic matrix part 10 is boehmite, the particles 11 may be particles only of a boehmite phase, or particles of a mixed phase of boehmite, and aluminum oxide or aluminum hydroxide other than boehmite. For example, the particles 11 may be a mixture of a phase of boehmite and a phase of gibbsite (Al(OH)$_3$). In this case, adjacent particles 11 preferably bond via at least one of aluminum oxide or aluminum oxide hydroxide. That is, it is preferably that the particles 11 not bond via an organic binder made from an organic compound and not bond via an inorganic binder made from an inorganic compound other than aluminum oxide and aluminum oxide hydroxide. Note that when the adjacent particles 11 bond via at least one of aluminum oxide or aluminum oxide hydroxide, the aluminum oxide and aluminum oxide hydroxide may be crystalline or may be amorphous.

Note that in the inorganic matrix part 10 made from boehmite, the presence ratio of the boehmite phase is preferably 50% by mass or more, more preferably 60% by mass or more, still more preferably 70% by mass or more. By increasing the ratio of the boehmite phase, the inorganic matrix part 10 can be obtained being lightweight and excellent in chemical stability and heat resistance. Note that the ratio of the boehmite phase in the inorganic matrix part 10 can be obtained by measuring the X-ray diffraction pattern of the inorganic matrix part 10 using an X-ray diffraction method and then performing a Rietveld analysis.

The average particle size of the particles 11 of the inorganic substance making up the inorganic matrix part 10 is not particularly limited. However, the average particle size of the particles 11 is preferably 300 nm or more and 50 μm or less, more preferably 300 nm or more and 30 μm or less, still more preferably 300 nm or more and 10 μm or less, particularly preferably 300 nm or more and 5 μm or less. The average particle size of the particles 11 of the inorganic substance within these ranges causes the particles 11 to firmly bond with each other, and this can increase the strength of the inorganic matrix part 10. The average particle size of the particles 11 of the inorganic substance within these ranges causes the percentage of pores present inside the inorganic matrix part 10 to be 20% or less, and it becomes possible to suppress the deterioration of the electrically conductive material part 20, as described below. Note that in this description, the value of "average particle size" is, unless otherwise stated, a value calculated as an average value of particle size of particles observed in several to several tens of visual fields by using observation means, such as a scanning electron microscope (SEM) or a transmission electron microscope (TEM).

The shape of the particles 11 of the inorganic substance is not particularly limited and can be spherical, for example. The particles 11 may be whisker-like (acicular) particles or scaly particles. Whisker-like particles or scaly particles have higher contact with other particles compared to spherical particles, which easily improves the strength of the inorganic matrix part 10. Thus, by using particles of such a shape for the particles 11, it becomes possible to enhance the strength of the entire composite member 100.

As described above, the inorganic substance making up the inorganic matrix part 10 more preferably contains a metal oxide hydroxide as a main component. Thus, it is preferable that the inorganic matrix part 10 also contain a metal oxide hydroxide as a main component. That is, it is preferable that the inorganic matrix part 10 contain a metal oxide hydroxide in an amount of 50 mol % or more, more preferably in an amount of 80 mol % or more.

Note that, the inorganic substance making up the inorganic matrix part 10 preferably contains substantially no hydrate. In this description, "an inorganic substance contains substantially no hydrate" means that the inorganic substance does not intentionally contain any hydrate. Thus, when a hydrate is mixed into an inorganic substance as an inevitable impurity, the condition: "an inorganic substance contains substantially no hydrate" is satisfied. Note that since boehmite is a metal oxide hydroxide, boehmite is not included in hydrates in this description.

Also, the inorganic substance making up the inorganic matrix part 10 preferably contains no hydrate of a calcium compound. The calcium compound here is tricalcium silicate (alite, $3CaO \cdot SiO_2$), dicalcium silicate (belite, $2CaO \cdot SiO_2$), calcium aluminate ($3CaO \cdot Al_2O_3$), calcium aluminoferrite ($4CaO \cdot Al_2O_3 \cdot Fe_2O_3$), or calcium sulfate ($CaSO_4 \cdot 2H_2O$). When the inorganic substance making up the inorganic matrix part 10 contains a hydrate of a calcium compound mentioned above, the composite member obtained may have a porosity exceeding 20% in the cross section of the inorganic matrix part. Thus, the inorganic substance preferably contains no hydrate of a calcium compound mentioned above. The inorganic substance making up the inorganic matrix part 10 also preferably contains no phosphate cement, zinc phosphate cement, and calcium phosphate cement. With the inorganic substance not containing these cements, it becomes possible to cause the obtained composite member to have a porosity of 20% or less.

The composite member 100 includes the electrically conductive material part 20 made from a material having electric conductivity. The electrically conductive material part 20 is dispersed inside the inorganic matrix part 10 and is in direct contact with and bonds with the inorganic matrix part 10. By dispersing the electrically conductive material part 20 having electric conductivity inside the inorganic matrix part 10, it becomes possible to cause the composite member 100 to exhibit electric conductivity. That is, by dispersing the electrically conductive material part 20 in the inorganic matrix part 10, a conductive path along which electrons are conducted is formed inside the inorganic matrix part 10, and this can enhance the electric conductivity of the composite member 100.

The material making up the electrically conductive material part 20 is not particularly limited as long as it has electric conductivity. The material making up the electrically conductive material part 20 is preferably at least one selected from the group consisting of a metal, a carbon material, a metal oxide, a metal nitride, a metal carbide, and an organic compound. As described below, the composite member 100 can be obtained using a low-temperature sintering method in which heating is performed at a low temperature of 300° C. or less. Thus, even an electrically conductive material having low heat resistance, such as an organic compound, can be used as a material making up the electrically conductive material part 20. Since the heating temperature is low in the low-temperature sintering method, there is hardly any occurrence of an oxidation reaction in the material making up the electrically conductive material part 20. Thus, the composite member 100 can be manufactured in the atmosphere, not in an inert atmosphere.

The electrically conductive material part 20 is preferably made from a metal. At least one metallic element selected from the group consisting of gold, silver, copper, platinum, iridium, palladium, ruthenium, rhodium, titanium, aluminum, tantalum, niobium, tungsten, molybdenum, vanadium, magnesium, chromium, iron, cobalt, nickel, zinc, tin, and lead can be used as the metal making up the electrically conductive material part 20. The metal making up the electrically conductive material part 20 may be a single element from among these metallic elements, or an alloy of any combination of these metallic elements.

It is also preferable that the electrically conductive material part 20 be made from a carbon material. The carbon material making up the electrically conductive material part 20 is preferably at least one selected from the group consisting of carbon black, graphite, carbon fiber, carbon nanotubes, and electrically conductive diamond.

It is also preferable that the electrically conductive material part 20 be made from at least one selected from the group consisting of a metal oxide, a metal nitride, and a metal carbide. The metal oxide making up the electrically conductive material part 20 is preferably at least one selected from the group consisting of tin-doped indium oxide (ITO), zinc-doped indium oxide (IZO), antimony-doped tin oxide, fluorine-doped tin oxide (FTO), aluminum-doped zinc oxide (AZO), and gallium-doped zinc oxide (GZO). The metal nitride making up the electrically conductive material part 20 is preferably at least one selected from the group consisting of titanium nitride, zirconium nitride, tantalum nitride, vanadium nitride, chromium nitride, molybdenum nitride, and tungsten nitride. The metal carbide making up the electrically conductive material part 20 is preferably at least one selected from the group consisting of titanium carbide, zirconium carbide, niobium carbide, tantalum carbide, vanadium carbide, chromium carbide, molybdenum carbide, and tungsten carbide.

It is also preferable that the electrically conductive material part be made from an electrically conductive organic compound. The organic compound making up the electrically conductive material part 20 can be an electrically conductive polymer, for example. The electrically conductive polymer is preferably at least one selected from the group consisting of: polyacetylene, polydiacetylene, and polyyne, which are linear conjugated polymers; polyphenylene, polynaphthalene, polyfluorene, polyanthracene, polypyrene, and polyazulene, which are aromatic conjugated polymers; polypyrrole, polythiophene, polyfuran, polyselenophene, polyisotianaphthene, and polyoxadiazole, which are heterocyclic conjugated polymers; polyaniline and polythiazyl, which are heteroatom-containing conjugated polymers; polyphenylene vinylene and polythienylene vinylene, which are mixed-type conjugated polymers; and polyacene, polyphenanthrene, and polyperinaphthalene, which are ladder-type conjugated polymers. Note that it is also preferable that the electrically conductive polymer be poly(3,4-ethylenedioxythiophene) (PEDOT:PSS) doped with poly(4-styrenesulfonic acid). It is also preferable that the electrically conductive organic compound be an electrically conductive metal paste in which metal particles are dispersed in a polymer.

The shape of the electrically conductive material part 20 is not particularly limited and can be spherical, scaly, acicular, or fibrous, for example. However, the shape of the electrically conductive material part 20 is preferably acicular or fibrous. In this case, since multiple particles of the electrically conductive material part 20 easily come in contact with each other, an electrically conductive path is easily formed inside the inorganic matrix part 10. Thus, the number of electron conduction paths increases inside the inorganic matrix part 10, and it becomes possible to enhance the electric conductivity of the composite member 100.

Note that the electric conductivity of the composite member 100 greatly increases when the amount of the electrically conductive material part 20 in the inorganic matrix part 10 exceeds a threshold value called percolation concentration. Also, percolation concentration varies depending on the shape of the electrically conductive material part 20. Thus, when the shape of the electrically conductive material part 20 is acicular or fibrous, or when the particle size of the electrically conductive material part 20 is large, the threshold tends to decrease.

When the electrically conductive material part 20 is acicular or fibrous, the electrically conductive material part 20 preferably has an aspect ratio of 5 or more. This causes multiple particles of the electrically conductive material part 20 to more easily come in contact with each other, and thus it becomes possible to form many electrically conductive paths inside the inorganic matrix part 10. The aspect ratio is a ratio of length to diameter of the electrically conductive material part 20 (length/diameter), and the length and diameter of the electrically conductive material part 20 can be obtained by observing the cross section of the composite member 100 using a microscope.

In the composite member 100 according to the present embodiment, the electrically conductive material part 20 made from an electrically conductive material is arranged inside the inorganic matrix part 10 as described above. The inorganic matrix part 10 is made from an inorganic substance containing a metal oxide hydroxide. Since a metal oxide hydroxide is highly stable against oxygen and water vapor in the atmosphere, when the inorganic substance of the inorganic matrix part 10 is made from a metal oxide hydroxide, the oxygen permeability of the inorganic matrix part 10 becomes low and the gas barrier property is improved. Consequently, the contact of the electrically conductive material part 20 with oxygen and water vapor can be reduced, and thus the deterioration of the electrically conductive material part 20 can be suppressed. In addition, the composite member 100 can exhibit electric conductivity since an electrically conductive path due to the electrically conductive material part 20 is formed inside the inorganic matrix part 10.

Note that the electrically conductive material part 20 may be arranged in a highly dispersed state inside the inorganic matrix part 10 as illustrated in FIG. 1. However, in order to facilitate the formation of an electrically conductive path in the inorganic matrix part 10, it is preferable that particles of the electrically conductive material part 20 be connected in contact with each other. This increases the number of electrically conductive paths in the inorganic matrix part 10, and thus it becomes further possible to enhance the electric conductivity of the composite member 100.

Here, the particles 11 of the inorganic substance are preferably continuously present in the inorganic matrix part 10 of the composite member 100. That is, as illustrated in FIG. 1, in the inorganic matrix part 10, the particles 11 of the inorganic substance are preferably connected in contact with each other. The entire surface of the electrically conductive material part 20 is preferably covered with the inorganic matrix part 10. This further reduces the contact of the electrically conductive material part 20 with oxygen and water vapor, and thus it becomes possible to further suppress the oxidative deterioration of the electrically conductive material part 20.

In the composite member 100, the inorganic matrix part 10 preferably has a larger volume ratio than that of the electrically conductive material part 20. In the composite member 100, increasing the volume of the inorganic matrix part 10 to be greater than the volume of the electrically conductive material part 20 causes the periphery of the electrically conductive material part 20 to be easily covered with the particles 11 of inorganic substance. Thus, from the viewpoint of further suppressing the deterioration of the electrically conductive material part 20, the inorganic matrix part 10 preferably has a larger volume ratio than that of the electrically conductive material part 20.

In the composite member 100, the porosity in the cross section of the inorganic matrix part 10 is preferably 20% or less. That is, when the cross section of the inorganic matrix part 10 is observed, the average value of the percentage of pores per unit area is preferably 20% or less. When the porosity is 20% or less, the electrically conductive material part 20 can be sealed inside the dense inorganic substance. Thus, the ratio of contact between the electrically conductive material part 20 and oxygen and water vapor from the outside of the composite member 100 decreases, it becomes possible to suppress the oxidation of the electrically conductive material part 20 and to maintain the electric conductivity of the electrically conductive material part 20 for along time. Furthermore, in this case, the inorganic matrix part 10 has few internal pores and the inorganic substance is dense, and thus the composite member 100 can have high strength. Note that the porosity in the cross section of the inorganic matrix part 10 is preferably 15% or less, more preferably 10% or less, even more preferably 5% or less. As the porosity in the cross section of the inorganic matrix part 10 is smaller, the contact of the electrically conductive material part 20 with oxygen and water vapor is reduced, and thus it becomes possible to prevent the deterioration of the electrically conductive material part 20.

In this description, the porosity can be determined as follows. First, the cross section of the inorganic matrix part 10 is observed to distinguish the inorganic matrix part 10, the electrically conductive material part 20, and the pores. Then, the unit area and the area of pores in that unit area are measured to obtain the ratio of pores per unit area. After the ratio of pores per unit area is obtained at multiple points, the average value of the ratio of pores per unit area is taken as the porosity. Note that when the cross section of the inorganic matrix part 10 is observed, an optical microscope, a scanning electron microscope (SEM), or a transmission electron microscope (TEM) can be used. The unit area and the area of pores in that unit area may be measured by binarizing an image observed with a microscope.

Note that the shape of the composite member 100 is not particularly limited and can be a plate shape, for example. A thickness t of the composite member 100 is not particularly limited and can be 50 μm or more, for example. As described below, the composite member 100 is formed using a pressure heating method, and thus the composite member 100 can be easily obtained having a large thickness. Note that the thickness t of the composite member 100 can be 1 mm or more, or can be 1 cm or more. The upper limit of the thickness t of the composite member 100 is not particularly limited, and it can be 50 cm, for example.

As described above, the composite member 100 according to the present embodiment includes the inorganic matrix part 10, which is made from an inorganic substance including a metal oxide hydroxide, and the electrically conductive material part 20, which is present in a dispersed state inside the inorganic matrix part 10 and has electric conductivity. The porosity in the cross section of the inorganic matrix part 10 is 20% or less. In the composite member 100, the electrically conductive material part 20 is arranged inside the inorganic matrix part 10. Thus, the inorganic matrix part 10 reduces the contact between the electrically conductive material part 20 and oxygen and water vapor, the deterioration of the electrically conductive material part 20 can be suppressed and the electric conductivity can be exhibited for a long time. In addition, since the composite member 100 can be obtained using a low-temperature sintering method as described below, an electrically conductive material having low heat resistance, such as an electrically conductive polymer, can be used as the electrically conductive material part 20. Furthermore, a metal oxide hydroxide has a lower relative density than that of an oxide, and the composite member 100 can be obtained being lightweight.

Since the composite member 100 has electric conductivity, electrostatic dirt such as dust is unlikely to adhere thereto. That is, the composite member 100 has a conductive path formed inside due to the electrically conductive material part 20, and this suppresses charging to the composite member 100 and electrostatic dirt is unlikely to adhere thereto. Thus, as described below, using the composite member 100 as a building member, such as an exterior wall material, can suppress the adhesion of electrostatic dirt and maintain a beautiful appearance for a long time.

[Method for Manufacturing Composite Member]

Next, a method for manufacturing a composite member according to the present embodiment will be described. The composite member 100 can be manufactured by heating a mixture of precursor particles of an inorganic substance making up the inorganic matrix part 10 and an electrically conductive material making up the electrically conductive material part 20 while pressurizing the mixture in a state containing a solvent. By using such a pressure heating method, precursor particles of an inorganic substance react with the solvent to cause the particles to bond with each other, and thus the inorganic matrix part 10 can be formed where the electrically conductive material part 20 has been dispersed.

Specifically, a mixture is first prepared by mixing a powder of a precursor of an inorganic substance making up the inorganic matrix part 10 with an electrically conductive material making up the electrically conductive material part 20. The powder of the precursor of the inorganic substance and the electrically conductive material may be mixed in air or under an inert atmosphere. As the precursor of the inorganic substance making up the inorganic matrix part 10, a substance that forms a metal oxide hydroxide when heated and pressurized together with a solvent is used. For example, when the inorganic substance making up the inorganic matrix part 10 is boehmite, hydraulic alumina can be used as the precursor of the inorganic substance.

Next, a solvent is added to the mixture. As the solvent, a solvent that reacts with the inorganic substance precursor to form a metal oxide hydroxide is used. As such a solvent, at least one selected from the group consisting of water, an acidic aqueous solution, an alkaline aqueous solution, an alcohol, a ketone, and an ester can be used. As the acidic aqueous solution, an aqueous solution having a pH of 1 to 3 can be used. As the alkaline aqueous solution, an aqueous solution having a pH of 10 to 14 can be used. As the acidic aqueous solution, an aqueous solution of an organic acid is preferably used. As the alcohol, an alcohol having 1 to 12 carbon atoms is preferably used.

Then, the mixture containing the inorganic substance precursor, the electrically conductive material, and the solvent is filled inside a mold. After the mold is filled with the mixture, the mold may be heated as necessary. Then, by applying pressure to the mixture inside the mold, the inside of the mold enters a high pressure state. At this time, the inorganic substance precursor and the electrically conductive material become denser to cause particles of the inorganic substance precursor to bond with each other, and at the same time, the inorganic substance precursor reacts with the solvent to be a metal oxide hydroxide. Consequently, the electrically conductive material part 20 can be dispersed inside the inorganic matrix part 10, which has been made from the metal oxide hydroxide.

Heating and pressurizing conditions for the mixture containing the inorganic substance, the electrically conductive material, and the solvent are not particularly limited as long as the conditions are such that the solvent reacts with the inorganic substance precursor to form a metal oxide hydroxide. For example, it is preferable that the mixture containing the inorganic substance precursor, the electrically conductive material, and the solvent be heated to 50 to 300° C. and then be pressurized at a pressure of 10 to 600 MPa. Note that the temperature at which the mixture containing the inorganic substance, the electrically conductive material, and the solvent is heated is more preferably 80 to 250° C., still more preferably 100 to 200° C. The pressure at which the mixture containing the inorganic substance, the electrically conductive material, and the solvent is pressurized is more preferably 50 to 600 MPa, still more preferably 200 to 600 MPa.

Then, the composite member 100 is obtained by taking out the molded body from the inside of the mold.

Here, a method for manufacturing the composite member 100 is described where the inorganic substance making up the inorganic matrix part 10 is boehmite. The composite member 100 where the inorganic substance is boehmite can be manufactured by mixing hydraulic alumina, which is an inorganic substance precursor, an electrically conductive material making up the electrically conductive material part 20, and a solvent containing water, and then pressing and heating the mixture. The hydraulic alumina is an oxide obtained by heat-treating aluminum hydroxide and contains ρ alumina. Such hydraulic alumina has the property of bonding and hardening through a hydration reaction. Thus, by using the pressure heating method, the hydration reaction of the hydraulic alumina progresses to cause the hydraulic alumina to bond together and the crystal structure is changed to boehmite, and this can form the inorganic matrix part 10.

Specifically, a hydraulic alumina powder, an electrically conductive material making up the electrically conductive material part 20, and a solvent containing water are first mixed to prepare a mixture. The solvent containing water is preferably pure water or ion exchange water. However, the solvent containing water may contain an acidic substance or an alkaline substances in addition to water. As long as the solvent contains water as the main component, an organic solvent (for example, an alcohol) may be contained.

The amount of a solvent added to the hydraulic alumina is preferably such an amount that would sufficiently progress the hydration reaction of the hydraulic alumina. The amount of a solvent added is preferably 20 to 200% by mass, more preferably 50 to 150% by mass, with respect to the hydraulic alumina.

Next, the mixture made by mixing the hydraulic alumina, the electrically conductive material, and the solvent containing water is filled inside the mold. After the mold has been filled with the mixture, the mold may be heated as necessary. Then, by applying pressure to the mixture inside the mold, the inside of the mold enters a high pressure state. At this time, the hydraulic alumina becomes highly packed, and particles of the hydraulic alumina bond with each other to have increased density. Specifically, by adding water to the hydraulic alumina, the hydraulic alumina undergoes a hydration reaction to form boehmite and aluminum hydroxide on the surface of particles of the hydraulic alumina. By pressurizing the mixture in the mold while heating, the generated boehmite and aluminum hydroxide mutually diffuse among adjacent particles of the hydraulic alumina, and thus the particles of the hydraulic alumina gradually bond with each other. Then, the dehydration reaction progresses due to heating, and the crystal structure changes from aluminum hydroxide to boehmite. Note that it is presumed that the hydration reaction of the hydraulic alumina, the mutual diffusion among the hydraulic alumina particles, and the dehydration reaction progress almost simultaneously.

When the molded body is taken out from the inside of the mold, the composite member 100 can be obtained with the particles 11 having bonded with each other via at least one of aluminum oxide or aluminum oxide hydroxide.

As described above, the method for manufacturing the composite member 100 includes a step of mixing an inorganic substance precursor making up the inorganic matrix part 10, an electrically conductive material making up the electrically conductive material part 20, and a solvent that reacts with the inorganic substance precursor to form a metal oxide hydroxide to obtain a mixture. The method for manufacturing the composite member 100 further includes a step of pressurizing and heating the mixture. Heating and pressurizing conditions for the mixture are preferably a temperature of 50 to 300° C. and a pressure of 10 to 600 MPa. In the manufacturing method according to the present embodiment, since the composite member 100 is formed under such low temperature conditions, the composite member 100 can be obtained with deterioration of the electrically conductive material making up the electrically conductive material part 20 being suppressed and thus having electric conductivity.

Here, a sintering method has been known as a method for manufacturing an inorganic member made from ceramic. The sintering method is a method for obtaining a sintered body by heating an aggregate of a solid powder made from an inorganic substance at a temperature lower than the melting point. However, in the sintering method, the solid powder is heated to 1000° C. or higher, for example. Thus, when the sintering method is used to obtain a composite member made from an inorganic substance and an electrically conductive organic compound, it is not possible to obtain a composite member because the electrically conductive organic compound is carbonized due to heating at a high temperature. However, in the method for manufacturing the composite member 100 according to the present embodiment, a mixture made by mixing an inorganic substance precursor, an electrically conductive material, and a solvent is heated at a low temperature of 300° C. or less and thus the deterioration of the electrically conductive material is unlikely to occur. Thus, the electrically conductive material part 20 can be stably dispersed inside the inorganic matrix part 10 to impart electric conductivity.

Furthermore, when, for example, metal aluminum is used as an electrically conductive material to obtain an electrically conductive ceramic member, the metal aluminum is heated at a high temperature in the conventional sintering method, and thus the surface of the aluminum is oxidized unless an inert atmosphere is used. Hence, the electric conductivity may not be sufficiently improved in the obtained ceramic member. However, the composite member 100 is heated at a low temperature of 300° C. or less in the manufacturing method according to the present embodiment, and the oxidation of the aluminum can be suppressed and the electric conductivity of the composite member 100 can be enhanced even when metal aluminum is used as the electrically conductive material.

Furthermore, in the manufacturing method according to the present embodiment, a mixture formed by mixing an inorganic substance precursor, an electrically conductive material, and a solvent is pressurized while being heated, and thus the inorganic substance aggregates to form the inorganic matrix part 10, which is dense. Consequently, the number of pores inside the inorganic matrix part 10 decreases, and thus the composite member 100 can be obtained having high strength while the oxidative deterioration of the electrically conductive material part 20 is suppressed.

[Use of Composite Member]

Next, the use of the composite member 100 according to the present embodiment will be described. The composite member 100 can be used in a structure as it has electric conductivity and high mechanical strength, and can be formed into a plate shape having a larger thickness as described above. As a structure provided with the composite member 100, housing equipment, housing members, building materials, and buildings are preferable. Since housing equipment, housing members, building materials, and buildings are in great demand in human life, the use of the composite member 100 in the structures can be expected to have the effect of creating a new and large market. In addition, since the composite member 100 has electric conductivity and electrostatic dirt such as dust is unlikely to adhere thereto, by using the composite member 100 in a structure, a beautiful appearance can be maintained over a long period of time.

The composite member 100 according to the present embodiment can be used as a building member. A building member is a member manufactured for a building, and the composite member 100 can be used at least partially in the present embodiment. As described above, the composite member 100 can be formed in a plate shape having a large thickness, and further has high strength and high durability. Thus, the composite member 100 can be suitably used as a building member. Examples of the building member include an exterior wall material (siding) and a roof material. Further examples of the building member include road materials and exterior materials.

Furthermore, the composite member 100 according to the present embodiment can also be used for an interior member. Examples of the interior member include a bathtub, a kitchen counter, a washstand, and a flooring material.

Note that the composite member 100 according to the present embodiment can be used for applications other than the above-described building member and interior member. Specifically, the composite member 100 can also be used for a semiconductor holder, an electrostatic chuck, a heat dissipation member, a ceramic heater, a sliding member, an electromagnetic wave shielding member, a ceramic sensor, and the like.

EXAMPLES

The composite member according to the present embodiment will be described in more detail below with reference to examples, but the present embodiment is not limited thereto.

[Preparation of Test Samples]

Example 1

First, as the hydraulic alumina, hydraulic alumina BK-112 manufactured by SUMITOMO CHEMICAL COMPANY, LIMITED was prepared. Note that the hydraulic alumina has a median particle size of 16 μm. In addition, copper powder manufactured by FUJIFILM Wako Pure Chemical Corporation was prepared as a metal powder.

Figure 2:
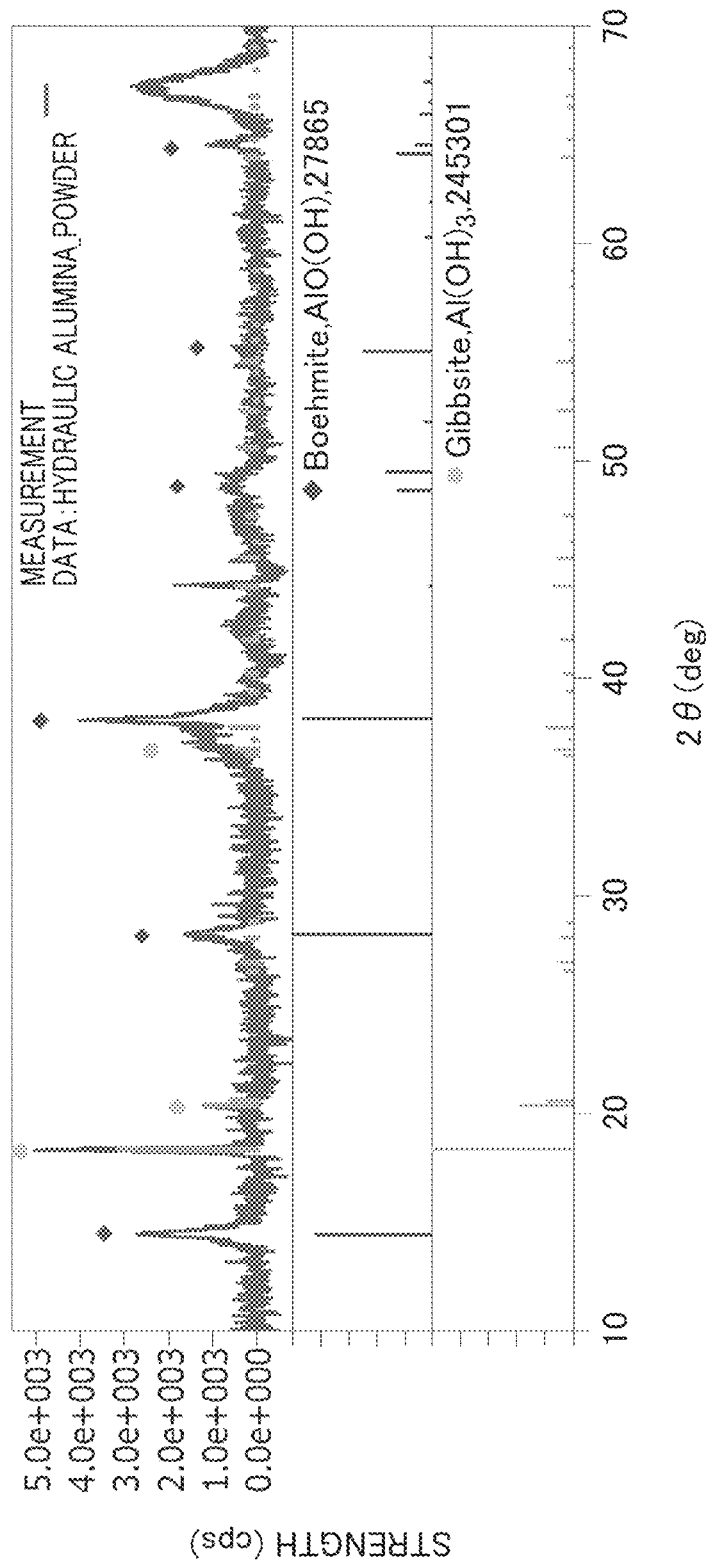
FIG. 2 is a graph illustrating an X-ray diffraction pattern of hydraulic alumina used in example 1 and patterns of boehmite (AlOOH) and gibbsite (Al(OH)$_3$) registered in the ICSD.

Here, FIG. 2 illustrates the X-ray diffraction pattern of powder of the above-mentioned hydraulic alumina and patterns of boehmite (AlOOH) and gibbsite (Al(OH)$_3$) registered in the ICSD. As illustrated in FIG. 2, it can be seen that the hydraulic alumina is a mixture of boehmite and gibbsite. Note that although not illustrated in FIG. 2, the hydraulic alumina also contains ρ alumina.

After the copper powder was weighed to be 15% by volume with respect to the hydraulic alumina, the hydraulic alumina and the copper powder were mixed using an agate mortar and pestle to obtain a mixed powder. Then, after ion exchange water was weighed to be 80% by mass with respect to the hydraulic alumina, the mixed powder and the ion exchange water were mixed using an agate mortar and pestle to obtain a mixture.

Next, the obtained mixture was put into a cylindrical molding die (φ10) having an internal space. The test sample of the present example was then obtained by heating and pressurizing the mixture under the conditions of 400 MPa, 180° C., and 20 minutes.

Example 2

The test sample of the present example was obtained in the same manner as example 1 except that the copper powder was added to be 25% by volume with respect to the hydraulic alumina.

Example 3

First, aluminum powder (manufactured by FUJIFILM Wako Pure Chemical Corporation) was prepared as a metal powder. Then, the test sample of the present example was obtained in the same manner as example 1 except that the copper powder was replaced with the aluminum powder, and the aluminum powder was added to be 19% by volume with respect to the hydraulic alumina.

Example 4

The test sample of the present example was obtained in the same manner as example 3 except that the aluminum powder was added to be 31% by volume with respect to the hydraulic alumina.

Example 5

The test sample of the example was obtained in the same manner as example 3 except that the aluminum powder was added to be 48% by volume with respect to the hydraulic alumina.

Comparative Example

The test sample of the present example was obtained in the same manner as example 1 except that no copper powder was added.

Table 1 shows the volume ratios of copper particles and aluminum particles as well as the press pressure and press temperature in the test samples obtained in examples 1 to 5 and the comparative example.

TABLE 1

| | Inorganic matrix part | Electrically conductive material part | Volume ratio (%) | Press pressure (MPa) | Press temperature (° C.) | Volume resistivity (Ω · m) |
|---|---|---|---|---|---|---|
| Comparative example | Hydraulic alumina | — | — | 400 | 180 | $3.0 \times 10^6$ |
| Example 1 | Hydraulic alumina | Cu | 15 | 400 | 180 | $8.5 \times 10^4$ |
| Example 2 | Hydraulic alumina | Cu | 25 | 400 | 180 | $4.0 \times 10^{-3}$ |
| Example 3 | Hydraulic alumina | Al | 19 | 400 | 180 | $7.0 \times 10^5$ |
| Example 4 | Hydraulic alumina | Al | 31 | 400 | 180 | $4.2 \times 10^3$ |
| Example 5 | Hydraulic alumina | Al | 48 | 400 | 180 | $1.5 \times 10^{-1}$ |

Reference Example

After ion exchange water was weighed to be 80% by mass with respect to the same hydraulic alumina as in example 1, the hydraulic alumina and the ion exchange water were mixed using an agate mortar and pestle to obtain a mixture. Next, the obtained mixture was put into a cylindrical molding die (φ10) having an internal space. The test sample of the present example was then obtained by heating and pressurizing the mixture under the conditions of 50 MPa, 120° C., and 20 minutes.

[Evaluation]

(Volume Resistivity Measurement)

Figure 3:
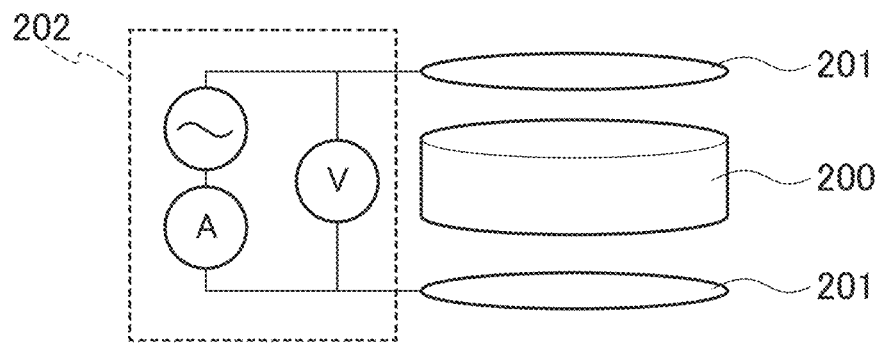
FIG. 3 is a schematic diagram for illustrating a method for measuring volume resistivity in test samples of examples and a comparative example.

The volume resistivity of each test sample of examples 1 to 5 and the comparative example was measured. Specifically, as illustrated in FIG. 3, a cylindrical test sample 200 was sandwiched between two sheets of aluminum foil 201. At this time, the aluminum foil 201 is in contact with the entire top and bottom surfaces of the test sample 200, respectively. After the resistance value between the two aluminum foil sheets was measured using a measuring instrument 202, the volume resistivity of each test sample was measured according to equation 1. Note that the measuring instrument 202 measures the resistance value using a two-terminal method. Also, the "surface area of test sample" in equation 1 is the area of the top or bottom surface of the test sample.

[Math. 1]

$$[\text{Volume resistivity}(\Omega \cdot m)] = \frac{[\text{Resistance value}(\Omega)] \times [(\text{Surface area of test sample}(m)^2)]}{[\text{Thickness of test sample}(m)]}$$

Table 1 shows the volume resistivity of each test sample in examples 1 to 5 and the comparative example. In addition, FIG. 4 illustrates the relationship between the volume resistivity and the volume ratio of metal particles in the test samples of examples 1 to 5 and the comparative example.

Figure 4:
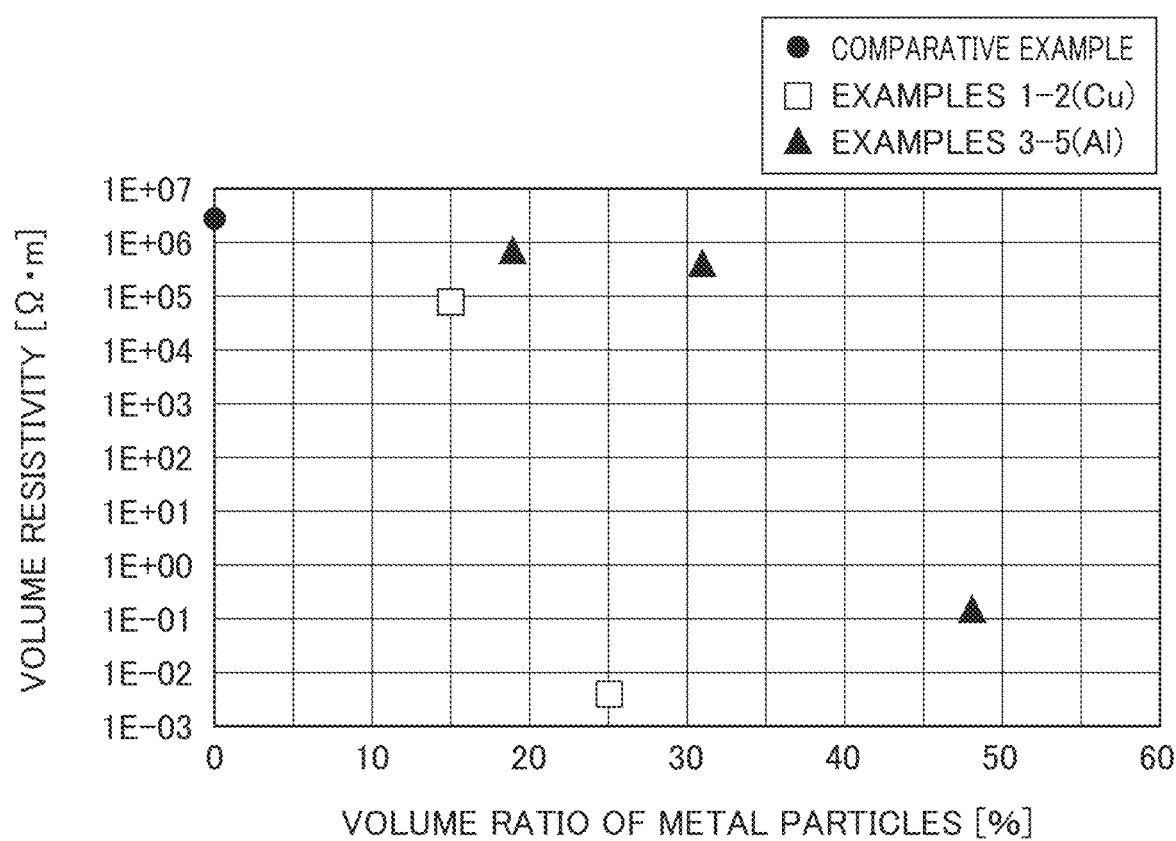
FIG. 4 is a graph illustrating a relationship between volume resistivity and the volume ratio of metal particles in the test samples of examples and a comparative example.

As illustrated in Table 1 and FIG. 4, it can be seen that the volume resistivity of the test samples of examples 1 to 5 decreases and electric conductivity is exhibited compared to the test sample of the comparative example without the electrically conductive material part. It can also be seen that the volume resistivity decreases as the electrically conductive material part increases. Note that when examples 1 and 2 are compared with examples 3 to 5, it can be seen that the volume resistivity of the test samples of examples 1 and 2 using copper decreases even though the volume ratio of metal particles is smaller. This is presumed to be due to the low volume resistivity of copper since the volume resistivity of copper is about $1.7 \times 10^{-8}$ Ω/m and that of aluminum is about $2.8 \times 10^{-8}$ Ω/m.

(Cross Section Observation)

The cross section of the test sample of example 2 was observed using a scanning electron microscope. Specifically, cross section polisher processing was first applied to a cylindrical cross section of the test sample of example 2. The cross section of the test sample was then observed using a scanning electron microscope at a magnification of 3,000 times. In FIG. 5, (a) is a secondary electron image of the cross section of the test sample, and (b) is a reflected electron image of the cross section of the test sample. As illustrated in FIG. 5, it can be seen that the inorganic matrix part 10 made from boehmite is present around and directly bonds with the electrically conductive material part 20 made from copper, and it can be further seen that the entire circumference of the electrically conductive material part 20 is covered with the inorganic matrix part 10. Thus, it can be seen that the inorganic matrix part 10 suppresses the oxidative deterioration of the electrically conductive material part 20 due to contact with air and water vapor.

(Porosity Measurement)

The porosity of the test sample of example 1 was measured as follows. First, cross section polisher processing was applied to a cylindrical cross section of the test sample of example 1. Next, using a scanning electron microscope, secondary electron images were observed at magnifications of 5,000 and 20,000 times on the cross section of the test sample. FIG. 6(a) is a secondary electron image of a result observed at a magnification of 5,000 times, and FIG. 7(a) is a secondary electron image of a result observed at a magnification of 20,000 times.

Then, pore parts were clarified by binarizing the secondary electron images in FIGS. 6(a) and 7(a). The binarized images of the secondary electron images in FIGS. 6(a) and 7(a) are illustrated in FIGS. 6(b) and 7(b), respectively. The area ratio of the pore parts was calculated from the binarized images, and the average value was taken as the porosity. Specifically, the area ratio of the pore parts was 15.9% from FIG. 6(b) and 11.9% from FIG. 7(b). Thus, the porosity of the test sample in example 1 was 13.9%, which was the average of the area ratios of the pore parts in FIGS. 6(b) and 7(b).

The porosity of the test sample in example 2 was similarly measured as follows. First, cross section polisher processing was applied to a cylindrical cross section of the test sample in example 2. Next, using a scanning electron microscope, secondary electron images were observed at magnifications of 5,000 and 20,000 times on the cross section of the test sample. FIG. 8(a) is a secondary electron image of a result observed at a magnification of 5,000 times, and FIG. 9(a) is a secondary electron image of a result observed at a magnification of 20,000 times.

Then, pore parts were clarified by binarizing the secondary electron images in FIGS. 8(a) and 9(a). The binarized images of the secondary electron images in FIGS. 8(a) and 9(a) are illustrated in FIGS. 8(b) and 9(b), respectively. The area ratio of the pore parts was calculated from the binarized images, and the average value was taken as the porosity. Specifically, the area ratio of the pore parts was 4.1% from FIG. 8(b), and the area ratio of the pore parts was 1.7% from FIG. 9(b). Thus, the porosity of the test sample in example 2 was 2.9%, which was the average of the area ratios of the pore parts in FIGS. 8(b) and 9(b).

From FIGS. 6 to 9, both the test sample in example 1 and the test sample in example 2 have a porosity of less than 15%, indicating that contact of the electrically conductive material part 20 with air and water vapor is reduced and thus the oxidative deterioration is suppressed.

(X-Ray Diffraction Measurement)

Figure 10:
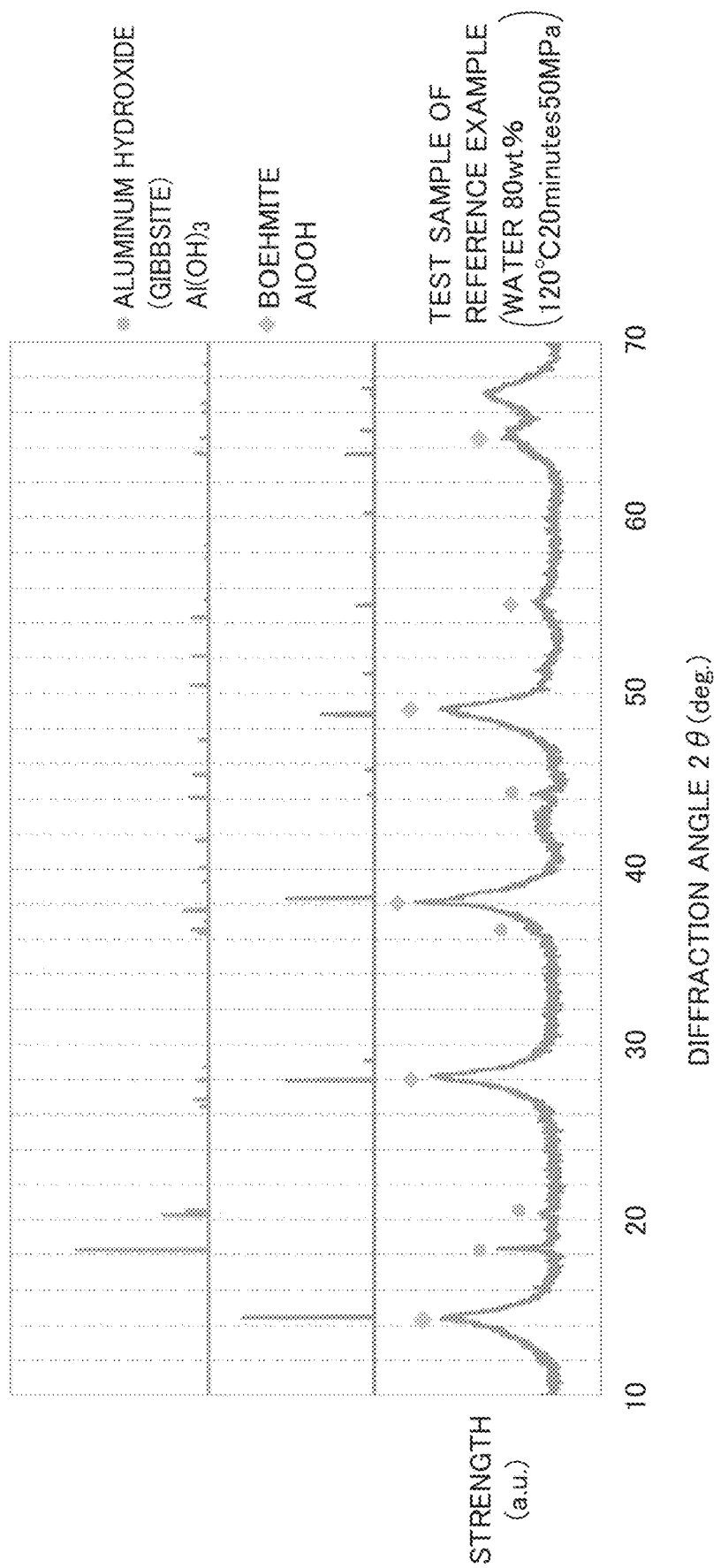
FIG. 10 is a graph illustrating an X-ray diffraction pattern of a test sample of a reference example and X-ray diffraction patterns of boehmite and gibbsite registered in the ICSD.

The X-ray diffraction pattern was measured using an X-ray diffraction apparatus on the test sample of the reference example. FIG. 10 illustrates the X-ray diffraction pattern of the test sample of the reference example and X-ray diffraction patterns of boehmite and gibbsite registered in the ICSD. It can be seen from FIG. 10 that the test sample of the reference example is a structure mainly made from boehmite. Thus, as illustrated in FIGS. 2 and 10, it can be seen that the raw material gibbsite (aluminum hydroxide) changes to boehmite due to the low-temperature sintering method.

Although the contents of the present embodiment have been described above with reference to the examples, it is obvious to those skilled in the art that the present embodiment is not limited to these descriptions, and various modifications and improvements are possible.

The entire contents of Japanese Patent Application No. 2019-197081 (filed on: Oct. 30, 2019) are incorporated herein by reference.

INDUSTRIAL APPLICABILITY

The present disclosure makes it possible to provide a composite member that does not need calcination under a high temperature and an inert atmosphere during manufacturing and is capable of imparting electric conductivity even when an electrically conductive material having low heat resistance is used.

REFERENCE SIGNS LIST

10 Inorganic matrix part
11 Particles of an inorganic substance
20 Electrically conductive material part
100 Composite member

The invention claimed is:

1. A composite member comprising:
an inorganic matrix part that is made from an inorganic substance including a metal oxide hydroxide; and
an electrically conductive material part that is present in a dispersed state inside the inorganic matrix part and has electric conductivity, wherein
a porosity in a cross section of the inorganic matrix part is 20% or less, and particles of the electrically conductive material part are connected in contact with each other.

2. The composite member according to claim 1, wherein the electrically conductive material part is made from a metal.

3. The composite member according to claim 1, wherein the electrically conductive material part is made from a carbon material.

4. The composite member according to claim 1, wherein the electrically conductive material part is made from at least one selected from the group consisting of a metal oxide, a metal nitride, and a metal carbide.

5. The composite member according to claim 1, wherein the electrically conductive material part is made from an electrically conductive organic compound.

6. The composite member according to claim 1, wherein the electrically conductive material part has an aspect ratio of 5 or more.

7. The composite member according to claim 1, wherein the metal oxide hydroxide is boehmite.

8. The composite member according to claim 7, wherein in the inorganic matrix part, the presence ratio of a boehmite phase is 50% by mass or more.

9. The composite member according to claim 1, wherein the electrically conductive material part is in direct contact with and bonds with the inorganic matrix part.

10. The composite member according to claim 1, wherein the inorganic matrix part includes multiple particles made from the inorganic substance, and the particles made from the inorganic substance bond with each other to form the inorganic matrix part.

11. The composite member according to claim 10, wherein an average particle size of the particles made from the inorganic substance is 300 nm or more and 50 μm or less.

12. The composite member according to claim 1, wherein the inorganic substance contains the metal oxide hydroxide in an amount of 50 mol % or more.

13. The composite member according to claim 1, wherein the inorganic matrix part contains the metal oxide hydroxide in an amount of 50 mol % or more.

14. The composite member according to claim 1, wherein the inorganic substance contains no hydrate of a calcium compound.

15. The composite member according to claim 1, wherein an entire surface of the electrically conductive material part is covered with the inorganic matrix part.

16. The composite member according to claim 1, wherein in the composite member, the inorganic matrix part has a larger volume ratio than that of the electrically conductive material part.

17. The composite member according to claim 1, wherein a thickness of the composite member is 50 μm or more.

* * * * *